United States Patent
Eckart

(10) Patent No.: US 10,462,473 B2
(45) Date of Patent: Oct. 29, 2019

(54) METHOD AND APPARATUS FOR RATE CONTROL FOR CONSTANT-BIT-RATE-FINITE-BUFFER-SIZE VIDEO ENCODER

(71) Applicant: ATI Technologies ULC, Markham (CA)

(72) Inventor: Stefan Eckart, Mountain View, CA (US)

(73) Assignee: ATI Technologies ULC, Markham, Ontario (CA)

(*) Notice: Subject to any disclaimer, the term of this patent is extended or adjusted under 35 U.S.C. 154(b) by 89 days.

(21) Appl. No.: 15/074,227

(22) Filed: Mar. 18, 2016

(65) Prior Publication Data

US 2016/0205402 A1 Jul. 14, 2016

Related U.S. Application Data

(60) Division of application No. 11/681,492, filed on Mar. 2, 2007, now Pat. No. 9,414,078, which is a (Continued)

(51) Int. Cl.
*H04N 19/177* (2014.01)
*H04N 19/12* (2014.01)
(Continued)

(52) U.S. Cl.
CPC ......... *H04N 19/177* (2014.11); *H04N 19/115* (2014.11); *H04N 19/12* (2014.11); (Continued)

(58) Field of Classification Search
None
See application file for complete search history.

(56) References Cited

U.S. PATENT DOCUMENTS 5,038,209 A   8/1991   Hang
5,241,383 A   8/1993   Chen et al.
(Continued)

OTHER PUBLICATIONS

Shin, Taehwan et al.; Hierarchical Scene Change Detection in an MPEG-2 Compressed Video Sequence; IEEE International Symposium; vol. 4; Jun. 1998.

*Primary Examiner* — Tracy Y. Li
(74) *Attorney, Agent, or Firm* — Faegre Baker Daniels LLP

(57) ABSTRACT

A method and apparatus for rate control for a constant-bit-rate finite-buffer-size video encoder is described. Rate control is provided by adjusting the size of non-intra frames based on the size of intra frames. A sliding window approach is implemented to avoid excessive adjustment of non-intra frames located near the end of a group of pictures. A measurement of "power" based on a sum of absolute values of pixel values is used. The "power" measurement is used to adjust a global complexity value, which is used to adjust the sizes of frames. The global complexity value responds to scene changes. An embodiment of the invention calculates and uses L1 distances and pixel block complexities to provide rate control. An embodiment of the invention implements a number of bit predictor block. Predictions may be performed at a group-of-pictures level, at a picture level, and at a pixel block level. An embodiment of the invention resets a global complexity parameter when a scene change occurs.

2 Claims, 10 Drawing Sheets

Related U.S. Application Data continuation of application No. 09/552,761, filed on Apr. 18, 2000, now Pat. No. 7,277,483.

(51) Int. Cl.

| | | |
|---|---|---|
| *H04N 19/33* | (2014.01) | |
| *H04N 19/423* | (2014.01) | |
| *H04N 19/593* | (2014.01) | |
| *H04N 19/65* | (2014.01) | |
| *H04N 19/176* | (2014.01) | |
| *H04N 19/172* | (2014.01) | |
| *H04N 19/149* | (2014.01) | |
| *H04N 19/115* | (2014.01) | |
| *H04N 19/124* | (2014.01) | |
| *H04N 19/14* | (2014.01) | |
| *H04N 19/142* | (2014.01) | |
| *H04N 19/152* | (2014.01) | |
| *H04N 19/182* | (2014.01) | |

(52) U.S. Cl.
CPC ........... *H04N 19/124* (2014.11); *H04N 19/14* (2014.11); *H04N 19/142* (2014.11); *H04N 19/149* (2014.11); *H04N 19/152* (2014.11); *H04N 19/172* (2014.11); *H04N 19/176* (2014.11); *H04N 19/182* (2014.11); *H04N 19/33* (2014.11); *H04N 19/423* (2014.11); *H04N 19/593* (2014.11); *H04N 19/65* (2014.11)

(56) References Cited

U.S. PATENT DOCUMENTS

| | | | | |
|---|---|---|---|---|
| 5,404,174 | A | * | 4/1995 | Sugahara ............... H04N 5/144 348/700 |
| 5,479,264 | A | * | 12/1995 | Ueda .................... G11B 27/032 375/240.12 |
| 5,686,963 | A | | 11/1997 | Uz et al. |
| 5,724,100 | A | | 3/1998 | Kuchibhotla |
| 6,226,326 | B1 | | 5/2001 | Mihara |
| 6,337,879 | B1 | * | 1/2002 | Mihara ................ H04N 19/159 375/240 |
| 6,381,275 | B1 | * | 4/2002 | Fukuhara ............... H04N 19/00 375/240.06 |
| 6,507,615 | B1 | | 1/2003 | Tsujii et al. |
| 6,614,942 | B1 | | 9/2003 | Meier |
| 6,690,833 | B1 | | 2/2004 | Chiang et al. |
| 7,277,483 | B1 | | 10/2007 | Eckart |
| 7,986,731 | B2 | | 7/2011 | Haskell et al. |
| 9,414,078 | B2 | | 8/2016 | Eckart |
| 2002/0136297 | A1 | * | 9/2002 | Shimada ............... H04N 19/176 375/240.04 |

* cited by examiner

METHOD AND APPARATUS FOR RATE CONTROL FOR CONSTANT-BIT-RATE-FINITE-BUFFER-SIZE VIDEO ENCODER

RELATED APPLICATIONS

This application is a divisional of co-pending U.S. application Ser. No. 11/681,492, which is a continuation of U.S. application Ser. No. 09/552,761 (now U.S. Pat. No. 7,277,483, filed Apr. 18, 2000, entitled "Method and Apparatus for Rate Control for Constant-Bit-Rate Finite-Buffer-Size Video Encoder", having as inventor Stefan Eckart, and owned by instant assignee and is incorporated herein by reference.

TECHNICAL FIELD OF THE INVENTION

The invention relates generally to video encoding and more specifically to a method and apparatus for rate control for a constant-bit-rate finite-buffer-size video encoder.

BACKGROUND OF THE INVENTION

Much technology has been developed to facilitate communication of images over media of finite bandwidth. It is generally desirable to communicate the highest quality of images possible over a medium of a given bandwidth. Thus, techniques such as video compression (e.g., compression according to a Moving Picture Experts Group (MPEG) format) have been developed to reduce the amount of data required to represent images. An MPEG format includes various types of frames, including intra frames and non-intra frames. Intra frames contain sufficient information to reconstruct an uncompressed video frame without the need to reference information in other MPEG frames. Non-intra frames contain less information, allowing reconstruction of an uncompressed video frame when combined with information from other MPEG frames.

To increase the efficiency of the compression, the relationship between the intra frames and the non-intra frames varies depending on the nature of the video stream being encoded. For example, if a video stream includes frames that differ very little from one to the next, non-intra frames containing little information can accurately represent uncompressed video frames. However, if, for example, the frames of the video stream differ substantially from one another, more information is needed to accurately convey the video stream. As an example, during a scene change when the video stream changes from portray one scene to a completely different scene, the image of the new scene generally bears no relationship to the image of the previous scene. Thus, an intra frame is usually used to provide information about the new scene.

As can be readily appreciated, the relationship between the size of the intra frames and the non-intra frames, and even the frequency of the intra frames relative to the non-intra frames, cannot easily be predicted. Added complication arises when the compressed frames are to be communicated over a medium of finite bandwidth. While circumstances such as a scene change may necessitate communication of more information, the available bandwidth does not expand to accommodate the additional information. The buffers used to store information from the compressed video stream during processing are of finite size. Thus, variations in a compressed video stream can lead to buffer overflow and underflow conditions, disrupting the reproduction of the video stream. To accommodate the finite bandwidth of the medium, it is desirable to produce a compressed video stream that occurs at a constant, or substantially constant, bit rate.

The visual quality of compressed video encoded by a constant-bit-rate finite-buffer-size video encoder depends substantially on the characteristics of the underlying rate-control technique. To operate efficiently, the rate-control technique makes assumptions regarding the compression properties of future frames (i.e., frames that have not yet been compressed). These assumptions can be based on analyzing the compression properties of future frames in advance. While this leads to high quality and stable operation, it also causes an increase in computational and storage demands that is not always economic. Also the overall system delay increases significantly because a frame can only be encoded after the future frames needed for encoding this frame have become available. Thus, it is desirable to avoid these disadvantages.

In addition to the accurate prediction of the compression properties of future frames, it is desirable for a rate-control control algorithm to ensure that the number of actually generated bits for the current frame closely matches the target number of bits allocated to the current frame. Since the functional relationship between the primary control variable (e.g., the quantization step size) and the resulting number of bits is highly non-linear, iteratively encoding the frame at different quantization step sizes is used to exactly arrive at a given number of bits per frame. This is computationally expensive. Thus, it is desirable to avoid this computational expense and complexity.

Furthermore, it is desirable for rate-control to be robust. Whenever the assumptions, (e.g., the predicted compression properties of future frames or the number of bits generated for the current frame) turn out to be inaccurate, finite buffer-size constraints still have to be dealt with, preferably in a manner that does not greatly affect visual quality. Thus, it is desirable to provide such robustness so as to ensure that constraints are met and visual quality is maintained.

Thus, a technique is needed to provide rate control for a constant-bit-rate finite-buffer-size video encoder that provides the desired features while avoiding the disadvantages.

DETAILED DESCRIPTION OF A PREFERRED EMBODIMENT

A method and apparatus for rate control for a constant-bit-rate finite-buffer-size video encoder is described. Rate control is provided by adjusting the size of non-intra frames based on the expected size of future intra frames. Here, the size of a frame is the number of bits in the encoded, or compressed, frame. A sliding window approach is implemented to avoid excessive adjustment of non-intra frames located near the end of a group of pictures. A measurement of "power" based on a sum of absolute values of pixel values is used. The "power" measurement is used to adjust a global complexity value, which is used to adjust the sizes of frames. The global complexity value responds to scene changes.

An embodiment of the invention calculates and uses L1 distances and pixel block complexities to provide rate control. An embodiment of the invention implements a number of bit predictor blocks. Predictions may be performed at a group-of-pictures level, at a picture level, and at a pixel block level. An embodiment of the invention resets a global complexity parameter when a scene change occurs.

Video data is organized as a sequence of frames. A frame represents an instantaneous image. Thus, the video data may be thought of as being divided in time into frames. The frames may be divided in space into smaller elements of the frames. As an example, the frames may be divided into an array of pixels. Frames may also be divided into groups of pixels, referred to as macroblocks or pixel blocks. One example of macroblock or pixel block is a 16×16 array of pixels.

The present invention is capable of advantageously using compression properties from past frames (frames that already have been compressed) and, possibly, the current frame, rather than requiring compression properties of future frames. High quality of compressed video is provided in accordance with accurate prediction of compression properties of future frames based on the available compression properties of past frames.

The rate-control features in accordance with an embodiment of the invention generate an accurate approximation of the desired number of bits in a single pass without iterations. Additionally, the present invention affords robust rate control.

Figure 1:
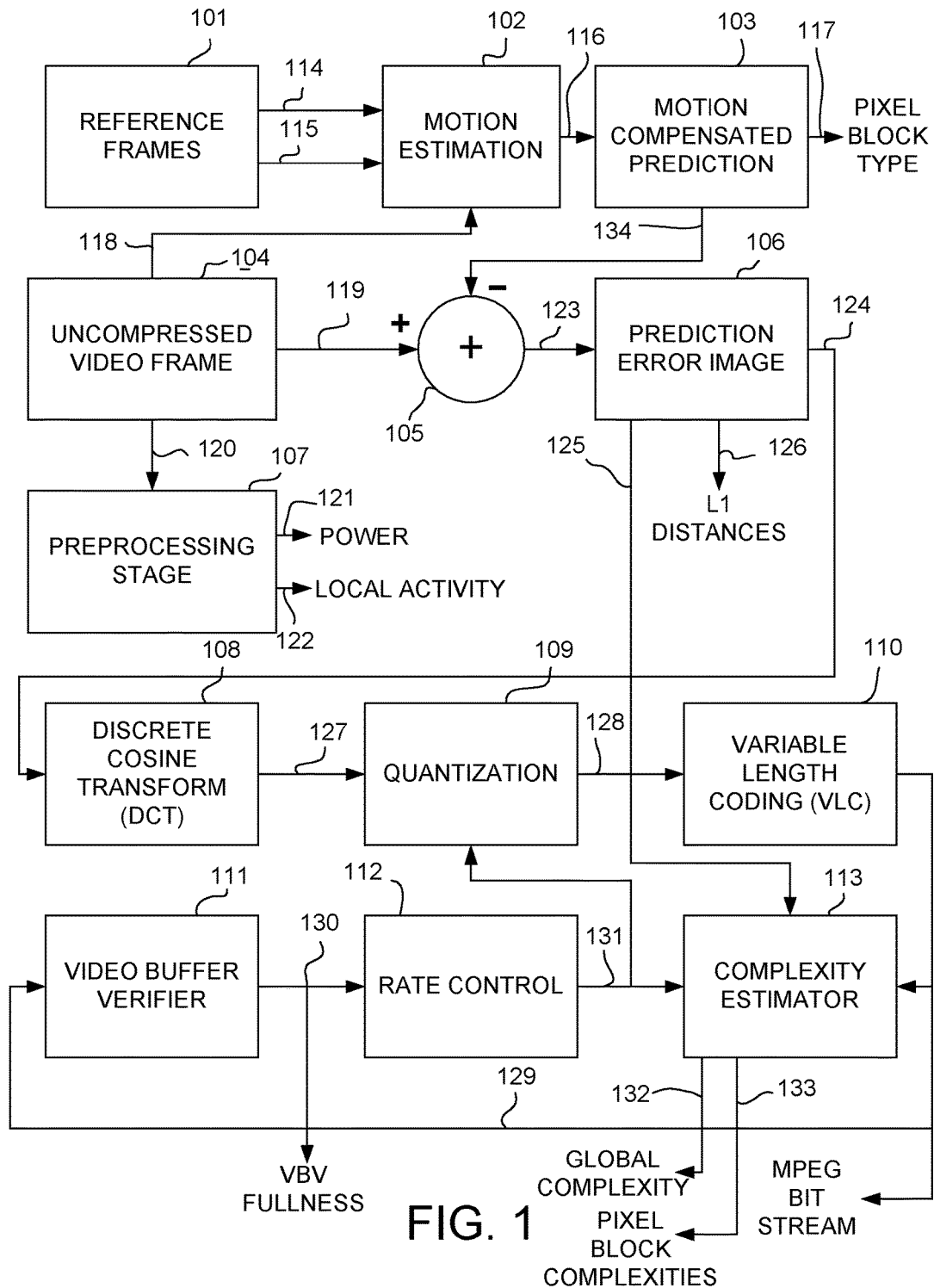
FIG. 1 is a block diagram illustrating a portion of an apparatus for rate control for a constant-bit-rate finite-buffer-size video encoder in accordance with an embodiment of the invention.

FIG. 1 is a block diagram illustrating a portion of an apparatus for rate control for a constant-bit-rate finite-buffer-size video encoder in accordance with an embodiment of the invention. FIG. 1 includes reference frame block 101, motion estimation block 102, motion compensated prediction block 103, uncompressed video frame block 104, adder 105, prediction error image block 106, preprocessing stage 107, discrete cosine transform (DCT) block 108, quantization block 109, variable length coding (VLC) block 110, video buffer verifier (VBV) 111, rate control 112, and complexity estimator 113.

Reference frame block 101 provides reference frames 114 and 115 to motion estimation block 102. Uncompressed video frame block 104 provides uncompressed video frames 118, 119, and 120 to motion estimation block 102, to adder 105, and to preprocessing stage 107. Preprocessing stage 107 determines a power value 121 and a local activity value 122. In one embodiment, the preprocessing stage 107 updates the power value for each subsequent picture or frame being encoded.

Motion estimation block 102 provides a motion estimate 116 to motion compensated prediction block 103. Motion compensated prediction block 103 provides a pixel block type indication 117. Motion compensated prediction block 103 also provides a motion compensated prediction frame 134 as a negative input to adder 105. Adder 105 subtracts the motion compensated prediction frame 134 from the uncompensated video frame 119 and provides the result 123 to prediction error image block 106.

Prediction error image block 106 provides a prediction error image 124 to DCT block 108. Prediction error image block 106 also determines when a scene change occurs and provides a scene change indication 125 to complexity estimator 113. Prediction image block 106 further provides L1 distances 126. The L1 distances represent a power measurement at the pixel block level that may be obtained by summing the absolute differences within a pixel block.

DCT block 108 provides a DCT result 127 to quantization block 109. Quantization block 109 performs quantization according to a quantizer step size, referred to as mquant, and provides a result 128 to VLC block 110. VLC block 110 provides an MPEG bit stream 129, which is fed back to complexity estimator 113 and VBV 111.

Figure 2:
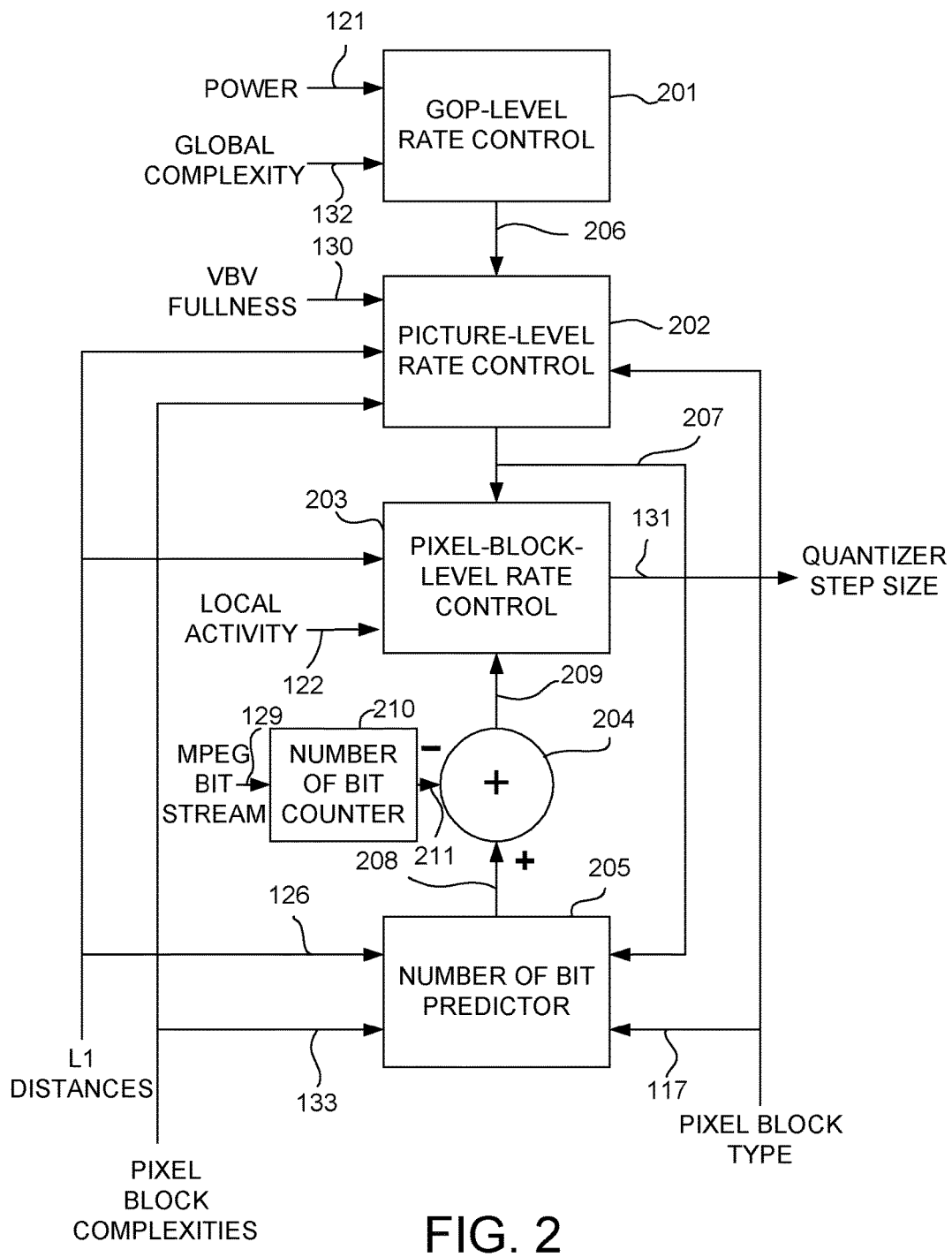
FIG. 2 is a block diagram illustrating a portion of an apparatus for rate control for a constant-bit-rate finite-buffer-size video encoder in accordance with an embodiment of the invention.

VBV 111 provides a VBV fullness output 130 to rate control block 112. Rate control block 112 provides quantizer step size 131 to quantization block 109 and to complexity estimator 113. Complexity estimator 113 is coupled to the prediction error image block 106 and provides a global complexity 132 and pixel block complexities 133. The pixel block complexities 133 include non-intra pixel block complexity values and intra pixel block complexity values. The complexity estimator 113 resets a global complexity value upon receipt of the scene change indication FIG. 2 is a block diagram illustrating a portion of an apparatus for rate control for a constant-bit-rate finite-buffer-size video encoder in accordance with an embodiment of the invention. FIG. 2 includes group-of-pictures-level (GOP-level) rate control 201, picture-level rate control 202, pixel-block-level rate control 203, adder 204, and number-of-bit predictor 205. GOP-level rate control 201 is operatively coupled to the preprocessing stage to receive the power value 121 and global complexity 132 and provides a target quantizer step size 206 used to provide rate control for the video encoder to picture-level rate control 202. The group-of-pictures-level rate control block causes an adjustment of sizes of non-intra frames based on the expected sizes of future intra frames.

The picture-level rate control block 202 is operatively coupled to the prediction error image block to receive the L1 distances 126. The picture-level rate control block 202 also receives VBV fullness output 130, pixel block complexities 133, and pixel block type 117 and provides a target quantizer step size for a pixel block to pixel-block-level rate control block 203 and to number-of-bit predictor block 205.

Number-of-bit-predictor block 205 receives L1 distances 126, pixel block complexities 133, and pixel block type 117, as well as picture-level rate control output 207. The number-of-bit predictor predicts a number of bits generated by the video encoder. Number-of-bit predictor block 205 provides a number-of-bit prediction output to adder 204. MPEG stream 129 is provided to a number-of-bit counter 210. The number-of-bit counter 210 provides an output 211 that is received by adder 204 as a negative input. Adder 204 subtracts output 211 from number-of-bit prediction output 208 and provides the result 209 to pixel-block-level rate control block 203. Pixel-block-level rate control block 203 receives local activity 122. Pixel-block-level rate control block 203 also receives L1 distances 126. Pixel-block-level rate control block 203 provides quantizer step size 131.

Figure 3:
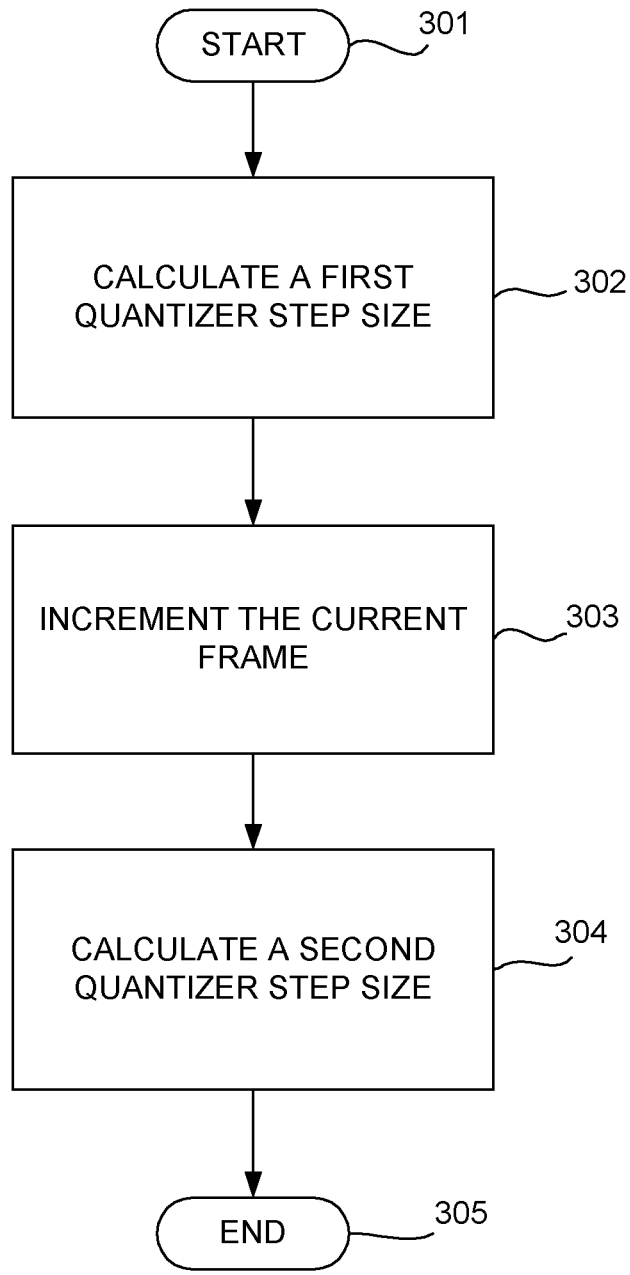
FIG. 3 is a flow diagram illustrating a method for rate control for a constant-bit-rate finite-buffer-size video encoder in accordance with an embodiment of the invention.

FIG. 3 is a flow diagram illustrating a method for rate control for a constant-bit-rate finite-buffer-size video encoder in accordance with an embodiment of the invention. A sliding window approach is used with respect to the GOP being processed. The sliding window approach avoids wide variations in rate control adjustments dependent upon the location of a frame (or picture) in a GOP.

The method begins in step 301 and continues to step 302. In step 302, a first quantizer step size is calculated such that a first number of bits generated at an output of the constant-bit-rate finite-buffer-size video encoder is constant over a first given number of frames (e.g., GOP) starting at a current frame. In step 303, the current frame is incremented. In step 304, a second quantizer step size is calculated such that a second number of bits generated at the output of the constant-bit-rate finite-buffer-size video encoder is constant over a second given number of frames starting at the incremented current frame. Thus, a full GOP is considered for each frame processed, rather than considering only those frames remaining in a static GOP or waiting until a second static GOP following the first static GOP is processed.

Figure 4:
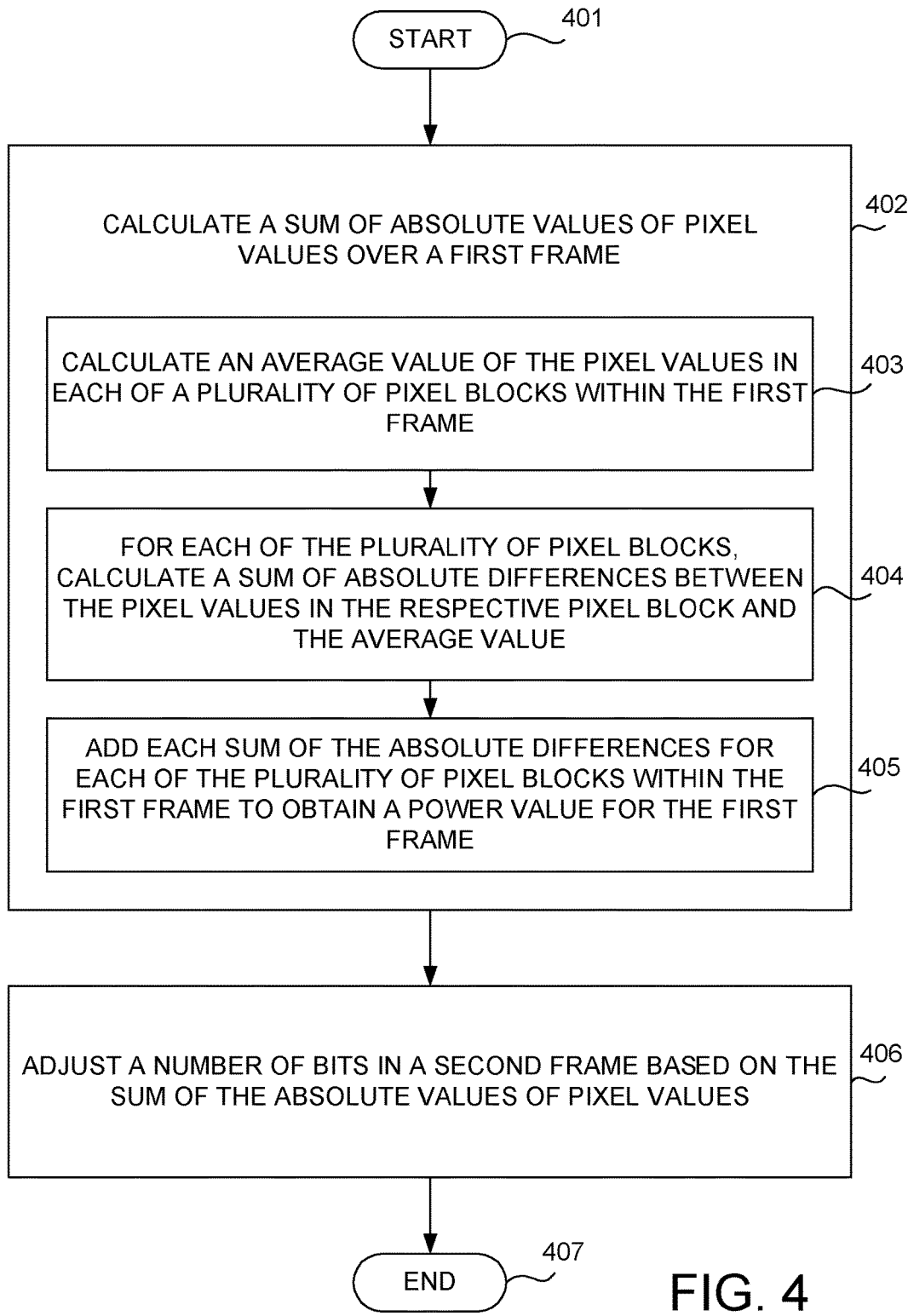
FIG. 4 is a flow diagram illustrating a method for rate control for a constant-bit-rate finite-buffer-size video encoder in accordance with an embodiment of the invention.

FIG. 4 is a flow diagram illustrating a method for rate control for a constant-bit-rate finite-buffer-size video encoder in accordance with an embodiment of the invention. The method begins in step 401. In step 402, a power value is calculated by calculating the sum of absolute values of pixel values over a first frame. Step 402 may include steps 403, 404, and 405. In step 403, an average value of the pixel values in each of a plurality of pixel blocks (e.g., macroblocks) within the first frame is calculated. In step 404, for each of the plurality of pixel blocks, a sum of absolute differences between the pixel values in the respective pixel block and the average value is calculated. This step may be repeated for all pixel blocks in the picture (e.g., frame). In step 405, each sum of the absolute differences for each of the plurality of pixel blocks within the first frame are added to obtain a power value for the first frame.

From step 402, the method continues to step 406. In step 406, a number of bits in a second frame are adjusted based on the sum of the absolute values of pixel values. The method ends in step 407.

Figure 5:
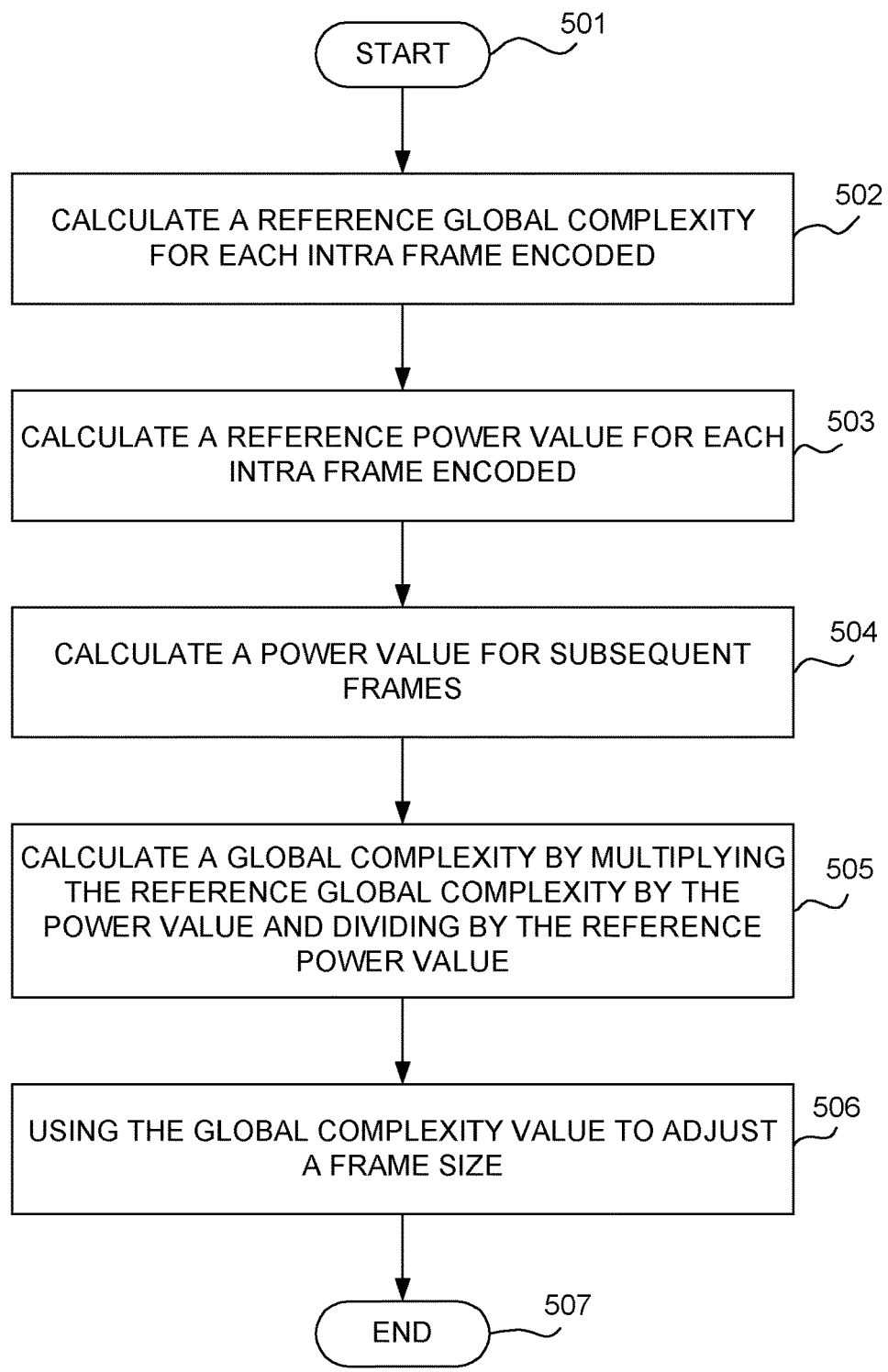
FIG. 5 is a flow diagram illustrating a method for rate control for a constant-bit-rate finite-buffer-size video encoder in accordance with an embodiment of the invention.

FIG. 5 is a flow diagram illustrating a method for rate control for a constant-bit-rate finite-buffer-size video encoder in accordance with an embodiment of the invention. A power value may be used to adjust a global complexity, which may be expressed as Xi. The method begins in step 501. In step 502, a reference global complexity is calculated for each intra frame encoded. In step 503, a reference power value is calculated for each intra frame encoded.

In step 504, a power value is calculated for subsequent frames. In step 505, a global complexity is calculated by multiplying the reference global complexity by the power value and dividing by the reference power value. In step 506, the global complexity is used to adjust a frame size. The method ends in step 507.

Figure 6:
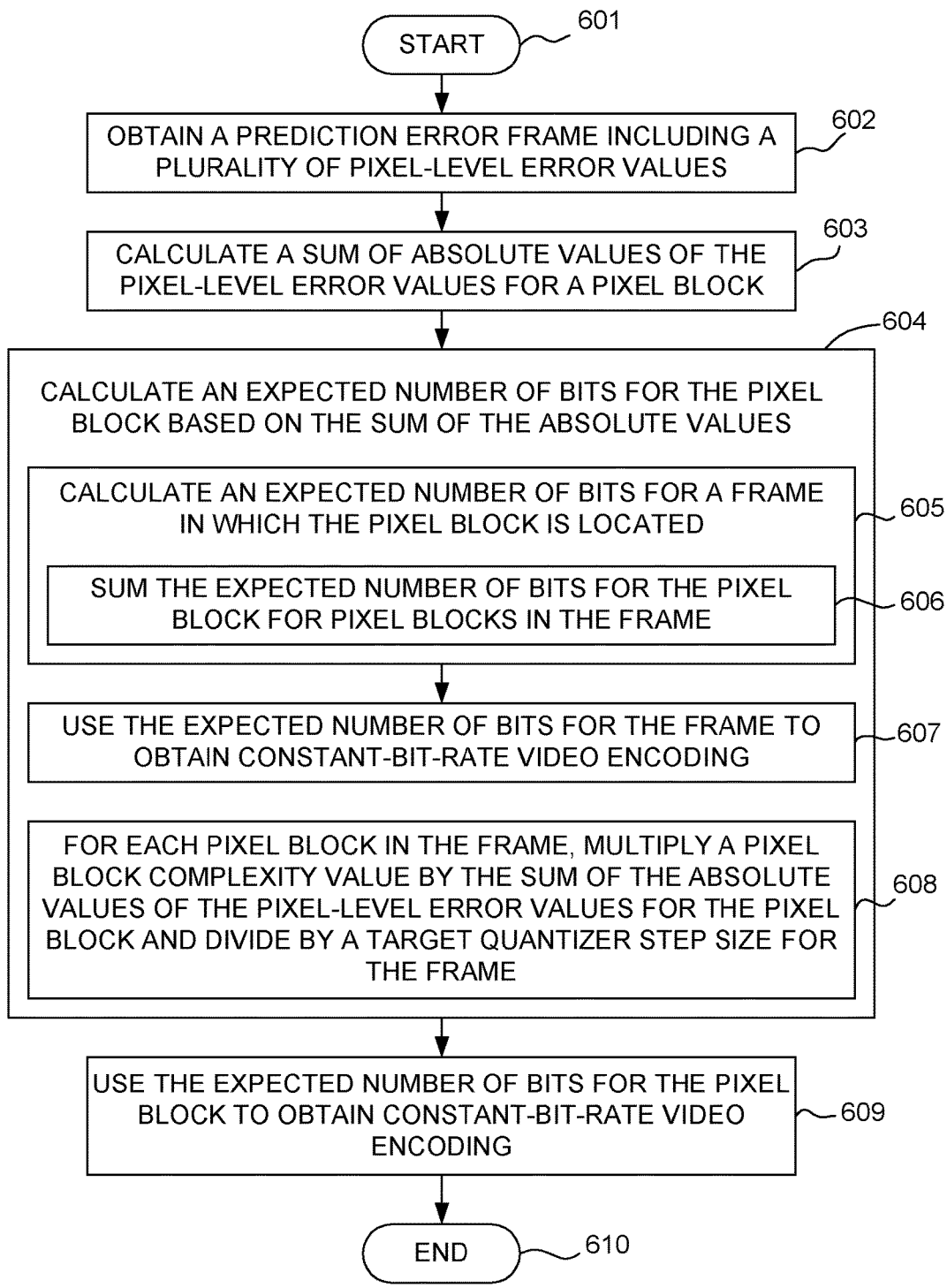
FIG. 6 is a flow diagram illustrating a method for rate control for a constant-bit-rate finite-buffer-size video encoder in accordance with an embodiment of the invention.

FIG. 6 is a flow diagram illustrating a method for rate control for a constant-bit-rate finite-buffer-size video encoder in accordance with an embodiment of the invention. The method begins in step 601. In step 602, a prediction error frame including a plurality of pixel-level error values is obtained. In step 603, a sum of absolute values of the pixel-level error values for a pixel block is calculated.

In step 604, an expected number of bits for the pixel block is calculated based on the sum of the absolute values, which may be expressed as $p_{mb}$. Step 604 may include steps 605 and 607 and/or step 608. In step 605, an expected number of bits for a frame in which the pixel block is located is calculated. Step 605 may also include step 606. In step 606, the expected number of bits for the pixel block are summed for all pixel blocks in the frame. In step 608, for each pixel block in the frame, a pixel block complexity value is multiplied by the sum of the absolute values of the pixel-level error values for the pixel block and dividing by a target quantizer step size for the frame. In step 607, the expected number of bits for the frame is used to obtain constant-bit-rate video encoding. In step 609, the expected number of bits for the pixel block is used to obtain constant-bit-rate video encoding. The process ends in step 610. L1 distances may be usefully employed in accordance with the method set forth above.

Figure 7:
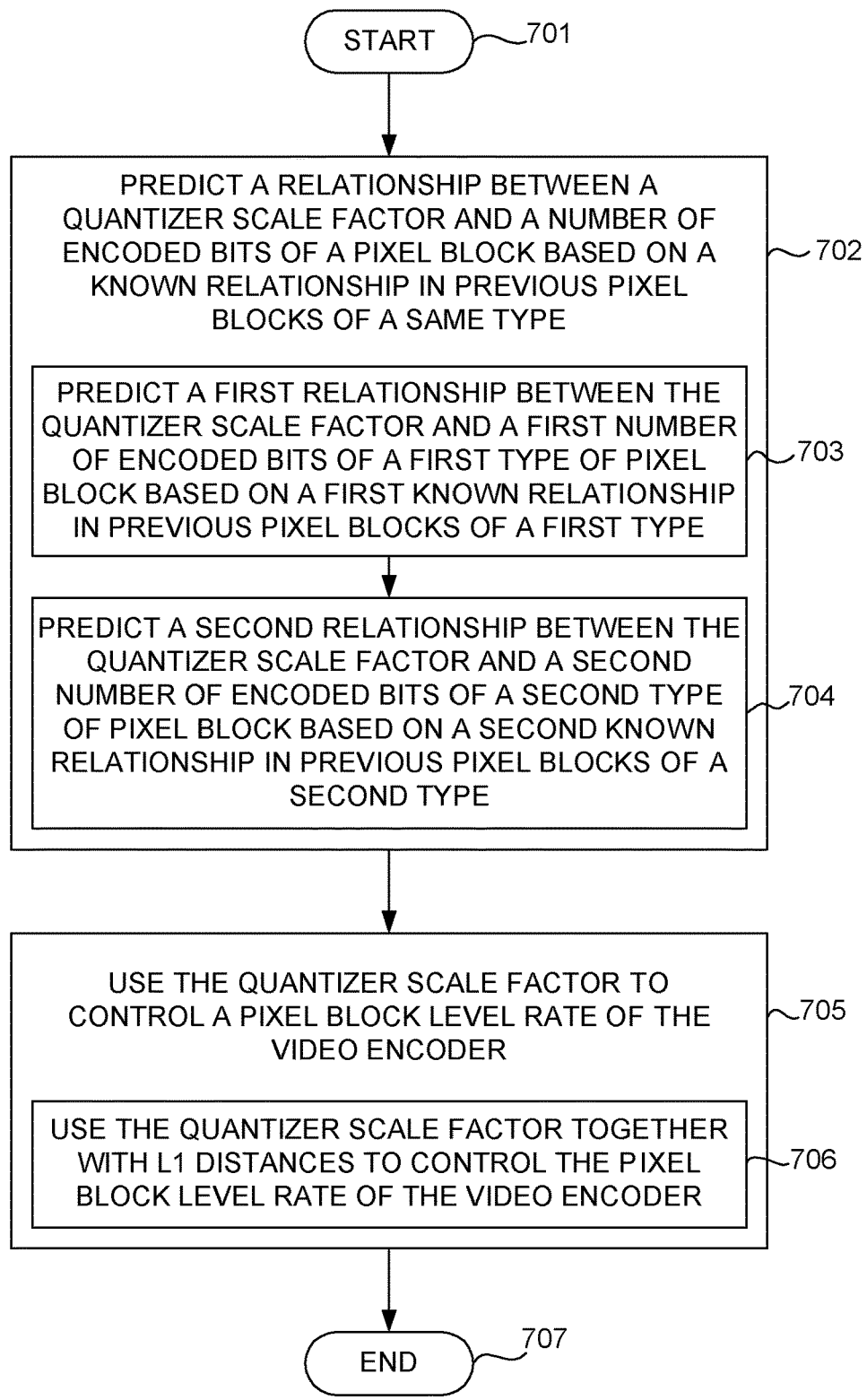
FIG. 7 is a flow diagram illustrating a method for rate control for a constant-bit-rate finite-buffer-size video encoder in accordance with an embodiment of the invention.

FIG. 7 is a flow diagram illustrating a method for rate control for a constant-bit-rate finite-buffer-size video encoder in accordance with an embodiment of the invention. The method starts in step 701. In step 702, a relationship between a quantizer scale factor and a number of encoded bits of a pixel block is predicted based on a known relationship in previous pixel blocks of a same type. Step 702 may also include steps 703 and 704. In step 703, a first relationship between the quantizer scale factor and a first number of encoded bits of a first type of pixel block is predicted based on a first known relationship in previous pixel blocks of the first type. In step 704, a second relationship between the quantizer scale factor and a second number of encoded bits of a second type of pixel block is predicted based on a second known relationship in previous pixel blocks of the second type. As an example, these relationships may be pixel block complexities. As can be seen, separate pixel block complexities may be determined for intra frame pixel blocks and for non-intra frame pixel blocks.

From step 702, the process continues to step 705. In step 705, the quantizer scale factor is used to control a pixel block level rate of the video encoder. Step 705 may include step 706. In step 706, the quantizer scale factor is used together with L1 distances to control the pixel block level rate of the video encoder. In step 707, the method ends.

Figure 8:
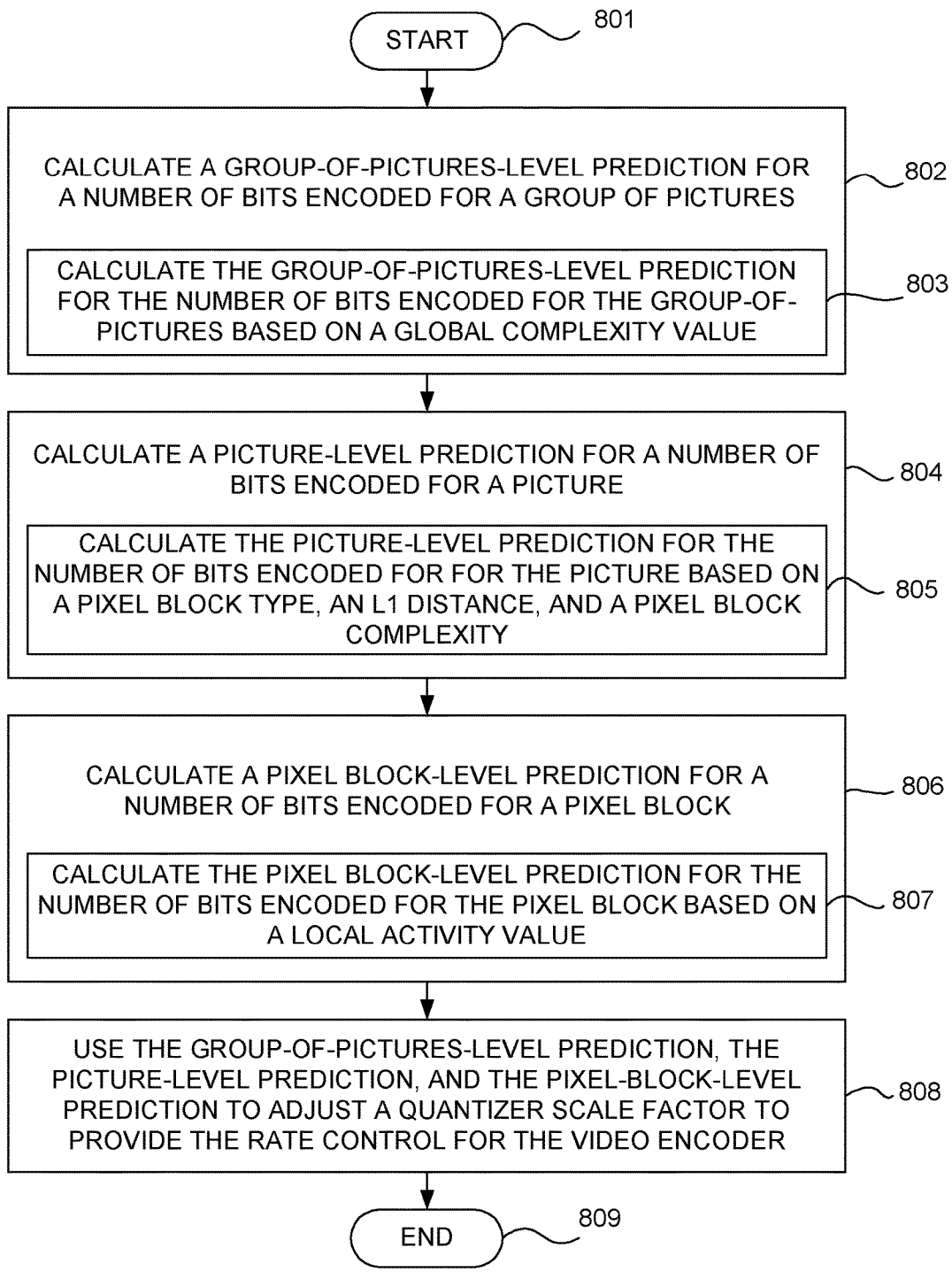
FIG. 8 is a flow diagram illustrating a method for rate control for a constant-bit-rate finite-buffer-size video encoder in accordance with an embodiment of the invention.

FIG. 8 is a flow diagram illustrating a method for rate control for a constant-bit-rate finite-buffer-size video encoder in accordance with an embodiment of the invention. The method begins in step 801. In step 802, a group-of-pictures-level prediction for a number of bits encoded for a group of pictures is calculated. Step 802 may include step 803. In step 803, the group-of-pictures-level prediction for the number of bits encoded for the group-of-pictures is calculated based on a global complexity value.

From step 802, the method continues in step 804. In step 804, a picture-level prediction for a number of bits encoded for a picture is calculated. Step 804 may include step 805. In step 805, the picture-level prediction for the number of bits encoded for the picture is calculated based on a pixel block type, an L1 distance, and a pixel block complexity.

From step 804, the method continues to step 806. In step 806, a pixel-block-level prediction for a number of bits encoded for a pixel block is calculated. Step 806 may include step 807. In step 807, the pixel-block-level prediction for the number of bits encoded for the pixel block is calculated based on a local activity value.

From step 806, the method continues to step 808. In step 808, the group-of-pictures-level prediction, the picture-level prediction, and the pixel-block-level prediction are used to adjust a quantizer scale factor to provide the rate control for the video encoder. The method ends in step 809. Thus, the method utilizes prediction of a number of bits at the GOP level, the picture (e.g., frame) level, and the pixel block (e.g., macroblock) level to achieve higher accuracy in prediction and more effective rate control.

Figure 9:
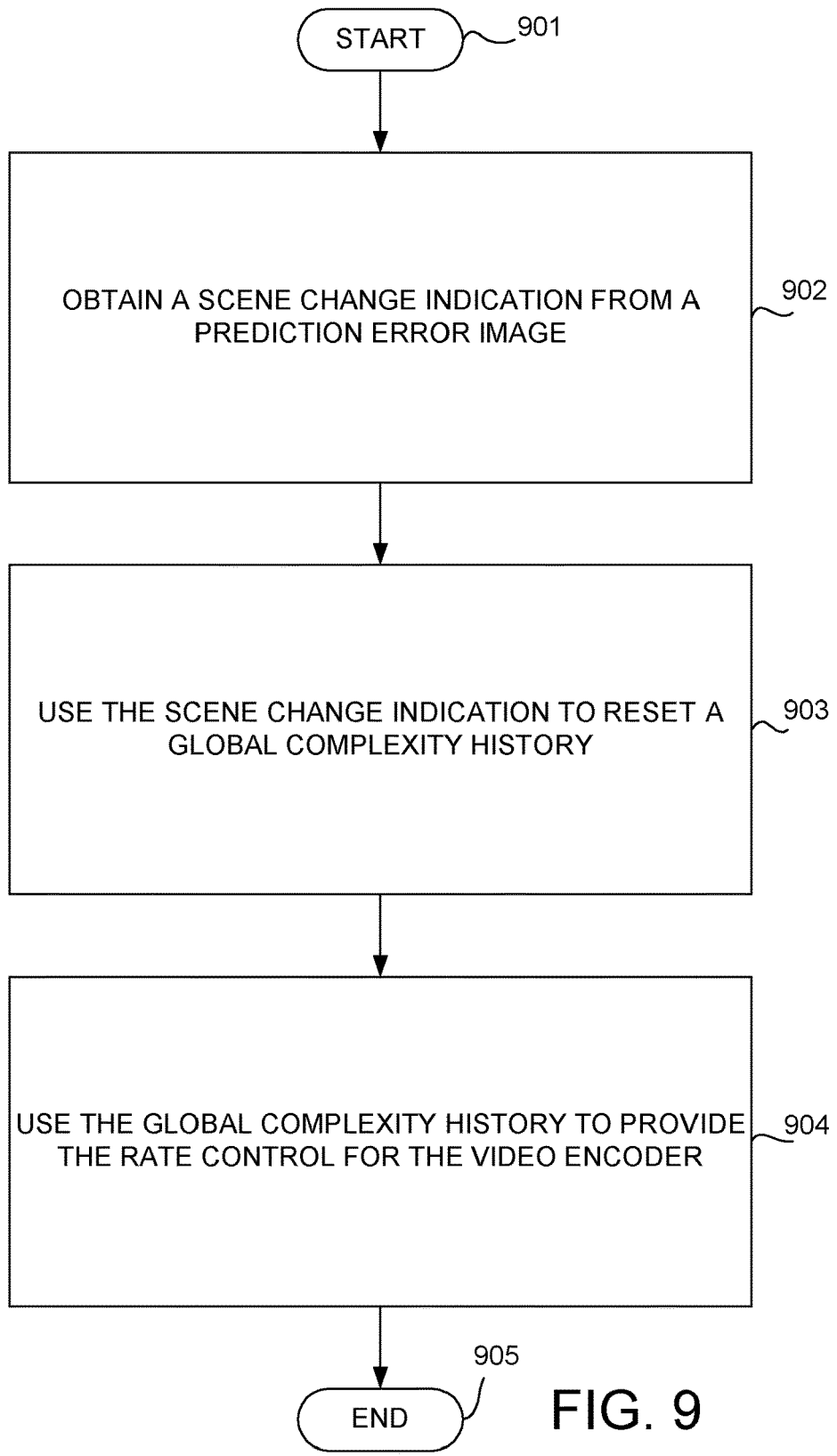
FIG. 9 is a flow diagram illustrating a method for rate control for a constant-bit-rate finite-buffer-size video encoder in accordance with an embodiment of the invention.

FIG. 9 is a flow diagram illustrating a method for rate control for a constant-bit-rate finite-buffer-size video encoder in accordance with an embodiment of the invention. The method begins in step 901. In step 902, a scene change indication is obtained from a prediction error image. This may be done, for example, by looking at the ratio between intra and non-intra coded macroblocks. From step 902, the method continues to step 903. In step 903, the scene change indication is used to reset a global complexity history (e.g., Xipb). From step 903, the method continues to step 904. In step 904, the global complexity history is used to provide the rate control for the video encoder.

Figure 10:
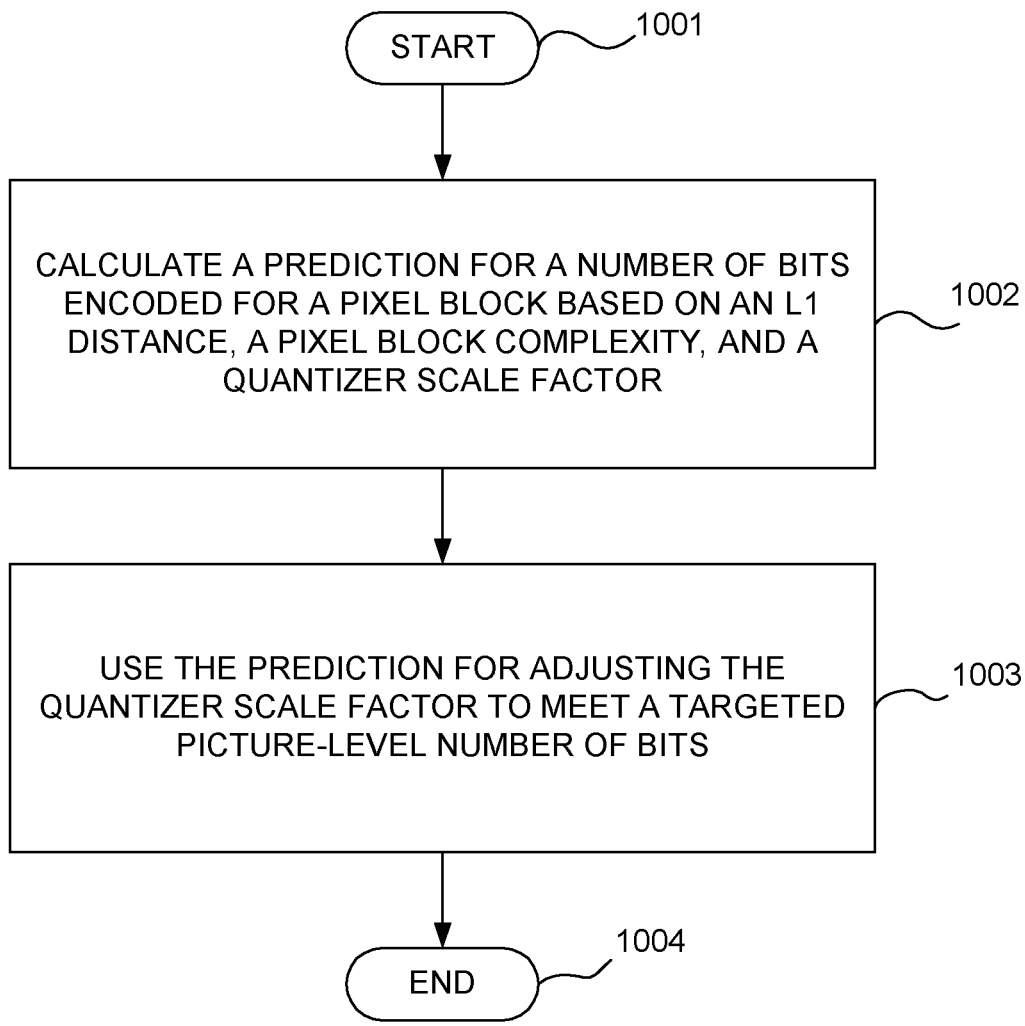
FIG. 10 is a flow diagram illustrating a method for rate control for a constant bit-rate-finite-buffer-size video encoder in accordance with an embodiment of the invention.

FIG. 10 is a flow diagram illustrating a method for rate control for a constant bit-rate-finite-buffer-size video encoder in accordance with an embodiment of the invention. The method begins in step 1001. In step 1002, a prediction for a number of bits encoded for a pixel block is calculated based on an L1 distance, a pixel block complexity, and a quantizer scale factor. In step 1003, the prediction is used for adjusting the quantizer scale factor (e.g., mquant) to meet a targeted picture-level number of bits. The method ends in step 1004.

In accordance with an embodiment of the invention, the rate control process is organized hierarchically as follows:
  GOP level: distributes bits to I, P and B pictures based on the GOP structure (IBP pattern) and the statistical properties of the individual picture types
  picture level: calculates the target bit allocation and mquant for the next picture based on statistical properties of that particular picture
  macroblock level: adjusts mquant to meet the target bit allocation (optional)
In addition the rate control handles the following tasks:
  VBV compliance (bitrate adjustment, emergency quant mode, bit stuffing)
  psychovisual masking (spatial activity based mquant modulation)
  estimation of various rate control parameters (adaptive rate control algorithm)
  GOP Level Rate Control The proportion of bits allocated to a picture depends on its picture type (I, P, or B). The allocation is based on the goal of achieving fixed mquant ratios as follows:

$$mquant_I/mquant_P/mquant_B = K_I/K_P/K_B \quad (1)$$

or, equivalently:

$$\frac{mquant_{ipb}}{K_{ipb}} = \frac{1}{c} = const \quad (2)$$

Throughout this document an index of ipb can have one of the values I, P, or B and indicates a picture type specific entity. In (2), c is a constant that depends on the bitrate and frame statistics.

The relationship between the mquant (or quantiser_scale) value used for encoding a frame and the resulting number of bits is complex and the only way to accurately calculate it is by actually encoding the frame at the given mquant value. For the purpose of rate control a highly simplified model is used instead as follows:

$$R_{ipb} = X_{ipb} \frac{1}{mquant_{ipb}} \quad (3)$$

An inverse proportional relationship is assumed between mquant and $R_{ipb}$, the number of bits per frame (or bitrate). In this document, all bitrates are expressed as bits per frame instead of bits per second, therefore the terms bits per frame and bitrate are used interchangeably.

$X_{ipb}$ denotes global (coding) complexity and characterizes the encoding process and its dependency on the frame content. In practice, $X_{ipb}$ is a function of mquant but rate control assumes it to be constant. $X_{ipb}$ is determined by parameter estimation as described later (cf. (27) and (31)).

Combing (2) and (3) results in $$R_{ipb} = c\frac{X_{ipb}}{K_{ipb}} = cX'_{ipb} \quad (4)$$

where X' is a short notation for X/K (normalized complexity). The average bitrate R for an entire GOP can be calculated as $$R = \frac{\sum_{ipb} N_{ipb} R_{ipb}}{\sum_{ipb} N_{ipb}} = \frac{\sum_{ipb} N_{ipb} R_{ipb}}{N} \quad (5)$$

where $N_{ipb}$ is the number of frames of a particular type in a GOP, and N is the total number of frames per GOP. For example, the typical case of IBBPBBPBBPBBPBB corresponds to N=15, $N_I$=1, $N_P$=4, $N_B$=10.

Substituting (4) into (5):

$$R = c\frac{\sum N_{ipb} X'_{ipb}}{N} \quad (6)$$

and solving for c:

$$c = \frac{NR}{\sum N_{ipb} X'_{ipb}} \quad (7)$$

allows to calculate the individual $R_{ipb}$ values (using (4)) as a function of the complexities X and the average bitrate R:

$$R_{ipb} = \frac{NRX'_{ipb}}{\sum N_{ipb} X'_{ipb}} \quad (8)$$

(Note that if $$\frac{\sum N_{ipb} X'_{ipb}}{N}$$

is interpreted as average GOP complexity $X'_{GOP}$, (8) simplifies to $$\frac{R_{ipb}}{R} = \frac{X'_{ipb}}{X'_{GOP}}.)$$

Normalized VBV Fullness

As a prerequisite for deriving the GOP level bitrate control equation, this section defines the concept of an actual and a normalized VBV fullness and their relationship. This is based on the observation that the difference between an expected actual VBV fullness and the current actual VBV fullness has a component that depends on the complexities, GOP structure, bitrate differences and position in the GOP pattern, which is undesirable. Introducing the concept of a normalized VBV fullness removes these dependencies.

The normalized VBV fullness is defined as the number of bits in the VBV if every frame would have been allocated the average number of bits per frame R, whereas the actual VBV fullness is based on allocating bits according to (8). The actual VBV fullness for the M'th frame (note that this M is not the I/P frame distance used in defining GOP patterns) in a GOP can be expressed as:

$$E_{R,M} = E_{R,0} + MR_0 - \sum_{k=0}^{M-1} R_{ipb(k)} = E_{R,0} + MR_0 - \sum_{ipb} M_{ipb} R_{ipb} \quad (9)$$

Here, $E_{R,0}$ is the VBV fullness the start of the GOP, $R_0$ is the constant bitrate of the VBV buffer model (i.e. the bit_rate parameter in the sequence header of the MPEG stream, converted from bits per second to bits per frame), $M_{ipb}$ is the number of I, P, and B frames, respectively, in the current GOP up to, but not including the current (M'th) frame, and ipb(k) is the picture type of the k'th frame.

The normalized VBV fullness is simply:

$$\overline{E}_{R,M} = E_{R,0} + M(R_0 - R) \quad (10)$$

It increases or decreases linearly over time, and is constant if the average bitrate matches the nominal bitrate of the stream.

Subtracting (9) from (10) allows conversion between actual and normalized buffer fullness:

$$\overline{E}_{R,M} = E_{R,M} + \Sigma M_{ipb} R_{ipb} - MR \quad (11)$$

Introducing the fraction of bits per GOP spent up to, but not including, the M'th frame, $\sigma_M$:

$$\sigma_M = \frac{\sum M_{ipb} R_{ipb}}{NR} \quad (12)$$

and the normalized difference between the actual and normalized allocation, $\delta_M$:

$$\delta_M = \frac{\sum M_{ipb} R_{ipb} - MR}{NR} = \sigma_M - \frac{M}{N} \quad (13)$$

equation (11) can be rewritten as:

$$\overline{E}_{R,M} = E_{R,M} + NR\delta_M \quad (11a)$$

For the special case of $R=R_0$ (nominal bitrate), and $E_{R_0,0}=E_0$ (nominal VBV fullness), equations (9) and (10) become $$E_{R_0,M} = E_0 + MR_0 - \Sigma M_{ipb} R_{ipb} = E_0 - NR_0 \delta_M \quad (9a)$$

$$\overline{E}_{R_0,M} = E_0 \quad (10a)$$

GOP Level Rate Control Equation

GOP level rate control adjusts the average bitrate R to ensure VBV compliance, which indirectly results in constant bitrate operation. Essentially it changes R proportionally to the deviation of the actual from the expected VBV fullness. (Note that this only guarantees that there is no long term drift between VBV and encoder but does not prevent temporary VBV underflow or overflow; this is handled separately). The control equation is expressed as follows:

$$\overline{E}_{R_0,M+N_t} = \overline{E}_{R,M+N_t} \quad (14)$$

(i.e., the bitrate R is set such that the expected normalized VBV fullness reaches the nominal normalized VBV fullness after $N_t$ frames).

The remaining step is to convert (14) into an explicit equation for R. Using (10a) and (10), (14) becomes:

$$E_0 = \overline{E}_{R,M} + N_t(R_0 - R) \quad (14a)$$

Substituting (9a), (10a), and (11a) into (14a) results in:

$$E_{R_0,M} + NR_0 \delta_M = E_{R,M} + NR \delta_M + N_t(R_0 - R) \quad (14b)$$

Solving (14b) for R:

$$R = R_0 + \frac{E_{R,M} - E_{R_0,M}}{N_t - N\delta_M} \quad (15)$$

As expected, the rate is adjusted proportionally to the difference between current and expected VBV fullness. The term $-N\delta_M$ in the denominator stems from the conversion from actual to normalized VBV levels, removing GOP position dependencies from the equation.

Picture Level Bit Allocation

At the GOP level the bit allocation for pictures is determined by (4). As discussed below, the complexities X used in this equation are a posteriori estimates optimized to provide an accurate long term estimate of the bitrate versus mquant relationship.

Bit allocation for the current picture is improved by using a priori knowledge of its statistical properties provided by the motion estimator. In addition, picture level bit allocation is responsible for preventing VBV underflows.

Picture level bit allocation models the relationship between the target mquant for the current picture, d, and target bit allocation for the current picture, T, by an equation similar to (3):

$$T = K_{ipb} \hat{X}' \frac{1}{d} \quad (3a)$$

where $\hat{X}'$ is the a priori knowledge based normalized complexity of the current frame. Computation of $\hat{X}'$ is discussed below (cf. equation (32)), it is based on L1 distances for the individual macroblocks, and local complexity estimates for intra and non-intra macroblocks.

Having two different estimates for the complexity of the current frame ($X'_{ipb}$, the 'typical' complexity derived as a long-term average based on posteriori knowledge about previously coded frames, and $\hat{X}'$, the 'actual' complexity based on a priori knowledge about the current, not yet encoded frame) leads to a variety of possible bit allocation schemes for the current frame. The two corner cases are as follow:

mquant preserving mode: use the mquant as determined by GOP level rate control $$d = \frac{K_{ipb}}{c},$$

(cf. (2)); the resulting number of bits may not match the number predicted by GOP level rate control; this mode keeps quality constant but may cause significant spikes in the allocation for frames that are more complex than anticipated at the GOP level bitrate preserving mode: try to encode the frame with a number of bits as close as possible to the number of bits allocated at the GOP level by adjusting the value of mquant; this mode results in higher stability (no unpredicted excursions in the VBV level), but may result in very large mquant values at scene changes (resulting in noticeable blockiness) and unnecessarily low mquant values for repeated frames (large mquant fluctuations for 3:2 pulldown material)

These corner cases, and all the intermediate ones, can be described using the notion of an effective complexity $X''$ in (4) as follows:

$$T = cX'' \qquad (4a)$$

Mquant preserving mode corresponds to setting $X''=\hat{X}'$, while bitrate preserving mode corresponds to $X''=X'_{ipb}$.

One embodiment of the invention uses the following equation to determine the effective complexity $X''$:

$$X'' = \begin{cases} X'_I & \text{scene change} \\ \min\left\{\frac{X'_{ipb} + \hat{X}'}{2}, \hat{X}'\right\} & \text{otherwise} \end{cases} \qquad (16)$$

In (16), $X'_I$ is the normalized complexity of I frames, $X'_{ipb}$ is the normalized complexity of frames of the type of the current frame (these are the same complexities as used by the GOP level rate control), and $\hat{X}'$ is the a priori knowledge based normalized complexity of the current frame.

By default (16) uses the average of $\hat{X}'$ and $X'_{ipb}$ to achieve a compromise between the constant quality of mquant preserving mode and the higher stability of bitrate preserving mode. The default mode of (16) is augmented by several experimentally determined heuristics that improve behavior at certain highly non-stationary events as follow:
repeated frames (including dropped frames and 3:2 pulldown)
scene changes Repeated frames coded as P or B pictures tend to have very low complexity since they can be very accurately predicted from their reference frame(s). With default mode bit allocation, too many bits are allocated to these frames, and mquant drops to a very low value. To avoid this behavior, (16) uses the minimum of $\hat{X}'$ and the average of $\hat{X}'$ and $X'_{ipb}$. Whenever the (a priori) actual complexity of the current frame is lower than the long term average complexity, (16) goes into mquant preserving mode, reducing the number of allocated bits below the one predicted at the GOP level.

P and B frames across scene changes are mostly coded using intra macroblocks and their encoding behaves similarly to that of I frames. Their complexity is usually much higher than that of regular P and B frames. The default mode underestimates the complexity of such a frame and therefore causes allocation of too few bits at an undesirably high mquant. On the other hand, choosing the obvious alternative, mquant preserving mode, can lead to extremely high bit allocation. This happens on scene changes from a low complexity to a high complexity scene because mquant then is still based on complexity values from the previous scene. Instead, (16) uses $X'_I$, the I frame complexity. This is provides improved performance based on the following:
1. P and B frames across a scene change behave like an I frame (mostly intra coded macroblocks)
2. as discussed below, $X'_I$ is adjusted for every picture (not just for I frames) based on the L1 variance of the current frame, and therefore already takes the changed complexity of the new scene into account Experiments have confirmed that explicitly using the I frame complexity $X'_I$ at scene changes results in an allocation that avoids huge mquant spikes and also avoids bit allocations that are much higher than the I frame bit allocation. Only if scene changes are not properly detected (which happens when they occur immediately before an I frame) B frames are encoded with higher than optimal mquant.

VBV Compliance

Using the target bit allocation T given in equation (4) results in a bitstream that has constant average bitrate $R_0$, but does not guarantee VBV compliance, i.e. occasional VBV underflows or overflow may occur. Therefore T is adjusted based on the restrictions imposed by the VBV model:

$$T' = \min\{T, T_{min}\}$$

$$T'' = f_{lim}(T', T_{max}) \qquad (17)$$

$T_{min}$ is a lower boundary for the number of bits required to avoid VBV overflow:

$$T_{min} = \lceil R_0 - (vbv\_buffer\_size - E_{R,M})\rceil \qquad (18)$$

Here $R_0$ is the nominal bitrate, vbv_buffer_size the value encoded in the sequence header, and $E_{R,M}$ the VBV fullness before encoding the current frame. $f_{lim}$ is a soft limiter defined by the following equation:

$$f_{lim}(x, x_{max}) = \begin{cases} x & x < \frac{x_{max}}{2} \\ \frac{x_{max}}{2} + \frac{\left(x - \frac{x_{max}}{2}\right)\frac{x_{max}}{2}}{x} & x \geq \frac{x_{max}}{2} \end{cases} \qquad (19)$$

For large x, this function asymptotically converges to $x_{max}$. The final value for the target mquant is obtained by inserting T'' in (3a):

$$d'' = K_{ipb}\frac{\hat{X}'}{T''} \quad (3b)$$

Macroblock Level Rate Control

Based on the target mquant d", macroblock level rate control determines the actual mquant for each macroblock in the picture taking the following aspects into account:
- psychovisual masking by local activity modulation
- adaptation of mquant to meet target bit allocation (T") by using feedback
- support of fractional mquant values by using dithering

Psychovisual Masking

A preprocessing stage computes the relative local activity $act_{mb}$ of every macroblock as $$\bar{u}(mb, b) = \frac{1}{64}\sum_{i,j=0}^{7} u_{i,j}(mb, b) \quad (20)$$

$$act'_{mb} = \min_{b=0\ldots 3}\sum_{i,j=0}^{7} |u_{i,j}(mb, b) - \bar{u}(mb, b)|$$

$$\overline{act'} = \frac{1}{n_{mb}}\sum_{mb=0}^{n_{mb}-1} act'_{mb}$$

$$act_{mb} = \frac{act'_{mb}}{\overline{act'}}$$

Here $u_{i,j}(mb,b)$ is the pixel value of the i,j-th pixel in block b of macroblock mb, $\bar{u}(mb,b)$ is the average pixel value of block b of macroblock mb, $act'_{mb}$ is the activity of macroblock mb, $\overline{act'}$ is the average activity of the picture, $act_{mb}$ is the relative activity of macroblock mb, and $n_{mb}$ is the total number of macroblocks in the picture.

The relative activity is mapped to an activity scaling factor $\alpha_{act,mb}$ using the following non-linear relation:

$$\alpha_{act,mb} = \frac{m_{act} \cdot act_{mb} + 1}{act_{mb} + m_{act}} \quad (21)$$

The parameter $m_{act}$ determines the degree of activity modulation.

mquant is multiplied with this scaling factor:

$$\text{mquant}'_{mb} = \alpha_{act,mb} d'' \quad (22)$$

where d" is the value from (3b).

Macroblock Level Control Loop

In order to reduce the mismatch between the target bit allocation T" and the actual number of bits generated for the current image, which is caused by the limited accuracy of the complexity model (3), a control loop adjusts mquant at the macroblock level based on the accumulated mismatch from the start of the picture up the current macroblock. This improves the rate control stability. Too strong feedback, however, can result in large spatial variations of mquant due to local complexity changes in the image. The following control equation is used:

$$\text{mquant}''_{mb} = \text{mquant}'_{mb} + kmb \cdot (S_{mb} - \hat{S}_{mb}) \quad (23)$$

$S_{mb}$ is the number of generated bits up to, but not including, macroblock number mb. $\hat{S}_{mb}$ is the expected value of the same quantity. It is calculated as:

$$\hat{S}_{mb} = \frac{1}{d''}\sum_{n=0}^{mb-1} \hat{X}_n \quad (24)$$

where $\hat{X}_n$ is the estimated macroblock complexity of the n-th macroblock (cf. equation (33)). kmb determines the loop gain of the first order loop. It is related to nmb, the number of macroblocks the (linearized) system requires to reduce a mismatch to 1/e of its original value ('time constant' of the control loop) as follows:

$$kmb = \frac{d'' n_{mb}}{T'' nmb} \quad (25)$$

Fractional mquant Support

The target mquant, d", is a real valued number, while the actual mquant used by the encoder is an integer. For small mquant, rounding d" to the nearest integer can result in a significant mismatch in the generated number of bits. Usually, this mismatch is compensated by the macroblock level control loop. If the latter is deactivated (kmb=0), the mquant values are dithered to approximate the real valued target value on average. A simple, one-dimensional, 1 tap error diffusion filter is used for this purpose.

Parameter Estimation

This section describes how various parameters used in the rate control algorithm are estimated from the actual content of the video sequence being encoded.

Global Complexities $X_{ipb}$, introduced in (3), is estimated from the relationship between mquant and generated number of bits of previously encoded pictures. At the end of each frame, the frame complexity $\tilde{X}$ of this frame is calculated as follows:

$$\tilde{X} = \begin{cases} S \cdot d'' \frac{n_{mb}}{n_{valid,mb}} & n_{valid,mb} > 0 \\ 0 & n_{valid,mb} = 0 \end{cases} \quad (26)$$

S is the number of bits generated for the frame, d" is the target mquant from (3b), $n_{mb}$ is the total number of macroblocks in the frame, $n_{valid,mb}$ is the number of macroblocks in the frame not encoded in 'emergency quantization mode'. Emergency quantization mode is entered if the number of bits in a partially encoded frame exceeds a threshold that indicates potential VBV buffer underflow. In this mode almost no bits are generated for the remaining macroblocks (only DC/(0,0) coefficients are encoded), independently of d".

For P and B frames, $\tilde{X}$ can vary noticeably from frame to frame. It is highly dependent on the efficiency of motion compensation, which in turn depends on the scene content. To reduce the effect of content dependency, a scene-change adaptive low-pass filter is applied to $\tilde{X}$ to produce $X_{ipb}$:

$$X_{ipb,k} = (1 - \alpha_{sc,ipb})X_{ipb,k-1} + \alpha_{sc,ipb}\tilde{X}, \text{ for } ipb=P,B \quad (27)$$

k denotes sequential numbers for frames of the same type. $\alpha_{sc,ipb}$ depends on the picture type (P or B) and whether or not a scene change was detected. $\alpha_{sc,ipb}$ is set according to the following table:

| $\alpha_{sc,ipb}$ | no scene change | scene change |
|---|---|---|
| P | 0.75 | 0.5 |
| B | 0.5 | 0.25 |

The same scheme could be applied to I frames as well. There are two drawbacks, however. First of all, the current scene detection scheme does not work for I frames (it is based on the intra vs. non-intra macroblock ratio). This would result in a non-adaptive α with a value close to 1.0. Secondly, I frames can be spaced considerably far apart (e.g. 15 frames) resulting in long intervals without new estimates for $X_I$. This is undesirable because $X_I$ not only affects bit allocation for I frames but indirectly also the allocation of P and B frames (i.e. an increased $X_I$ reduces the number bits allocated to P and B frames in anticipation of higher allocation requirements for the next I frame). Therefore an updated $X_I$ is provided for every frame. To this end, the global I frame complexity is modeled as $$X_I = X_0 \cdot P_{intra} \quad (28)$$

where $X_0$ is a constant and $P_{intra}$ is the total intra energy (or power) of the frame. $P_{intra}$ is calculated as $$P_{intra} = \sum_{mb=0}^{n_{mb}-1} P_{intra,mb} \quad (29)$$

$p_{intra,mb}$ is the intra energy of macroblock number mb as defined in (34) below. Note that $p_{intra,mb}$ is calculated at the same time as $act'_{mb}$ (cf. (20)) without significant additional computational overhead.

An estimate for $X_0$ is obtained from the most recent I frame k:

$$\hat{X}_{0,k} = \frac{\tilde{X}_k}{P_{intra,k}} \quad (30)$$

with $\tilde{X}$ from (26) and $P_{intra}$ from (29). The index k denotes that these values are those of the k-th I frame. For all frames m between the k-th (inclusive) and k+1-th (exclusive) I frame, $X_{I,m}$ is calculated from (28):

$$X_{I,m} = \hat{X}_{0,k} \cdot P_{intra,m} \quad (31)$$

A-priori Complexity

The normalized a-priori complexity for the current frame $\hat{X}'$ used in (3a) ff. is obtained from a-priori knowledge of the current frame before actually encoding it, in contrast to the 'a-posteriori' global complexity described in the previous section which is derived from values available only after actually encoding the frame.

$$\hat{X}' = \frac{1}{K_{ipb}} \sum_{mb=0}^{n_{mb}-1} \hat{X}_{mb} \quad (32)$$

$\hat{X}_{mb}$ is a macroblock complexity estimate which depends on the coding type of the macroblock:

$$\hat{X}_{mb} = \begin{cases} \frac{x_{intra} P_{intra,mb}}{\alpha_{act,mb}} & \text{intra coded macroblocks } (I, P, B) \\ \frac{x_{nonintra,p} P_{zeromv,mb}}{\alpha_{act,mb}} & \text{zero motionvector macroblocks } (P) \\ \frac{x_{nonintra,p} P_{nonintra,mb}}{\alpha_{act,mb}} & \text{non-intra coded macroblocks } (P) \\ \frac{x_{nonintra,b} P_{nonintra,mb}}{\alpha_{act,mb}} & \text{non-intra coded macroblocks } (B) \end{cases} \quad (33)$$

$\alpha_{act,mb}$ from (21) in the denominator of (33) accounts for the mquant modulation in (22). $x_{intra}$, $x_{nonintra,p}$, and $x_{nonintra,b}$ are the macroblock complexities for intra coded macroblocks, non-intra coded macroblocks in P frames, and non-intra coded macroblocks in B frames, respectively. $p_{intra,mb}$, $p_{zeromv,mb}$, and $p_{nonintra,mb}$ are the macroblock energies (or power) of intra coded, zero-motion vector coded, and non-intra coded macroblocks, respectively:

$$P_{intra,mb} = \sum_{b=0}^{3} \sum_{i,j=0}^{7} |u_{i,j}(mb, b) - \bar{u}(mb, b)| \quad (34)$$

$$P_{zeromv,mb} = \sum_{b=0}^{3} \sum_{i,j=0}^{7} |v_{0,i,j}(mb, b)|$$

$$P_{nonintra,mb} = \sum_{b=0}^{3} \sum_{i,j=0}^{7} |v_{i,j}(mb, b)|$$

Here $u_{i,j}(mb,b)$, $v_{0,i,j}(mb,b)$, and $v_{i,j}(mb,b)$ are the pixel value, the zero motion vector prediction error, and the motion-compensated prediction error of the i,j-th pixel in block b of macroblock mb, respectively. $\bar{u}(mb,b)$ is the average pixel value of block b of macroblock mb, defined in (20).

Intra/Non-intra Macroblock Complexities $x_{intra}$, $x_{nonintra,p}$, and $x_{nonintra,b}$ are a-posteriori estimates of the complexity of macroblocks of a particular type. They differ from the global complexities by being normalized with the macroblock energy (similar to $X_0$ in (30), but at the macroblock level). The underlying model for the number of bits generated for the current macroblock, $s_{mb}$, is:

$$s_{mb} = \frac{x \cdot P_{mb}}{mquant''_{mb}} \quad (35)$$

with x and p chosen according to the current macroblock coding type and picture type.

Estimates for $x_{intra}$, $x_{nonintra,p}$, and $x_{nonintra,b}$ are obtained from previous macroblocks of the same type.

$$x = \frac{\bar{s}_n}{\bar{P}_n}, \text{ with} \quad (36)$$

$$\bar{s}_n = (1 - \alpha_x)\bar{s}_{n-1} + \alpha_x(s_{mb} + s_0)$$

$$\bar{P}_n = (1 - \alpha_x)\bar{P}_{n-1} + \alpha_x\left(\frac{P_{mb}}{mquant''_{mb}} + P_0\right)$$

Equation (36) is evaluated independently for all 3 variants of x (intra, nonintra,p, nonintra,b). $\bar{s}_n$ and $\bar{p}_n$ are updated whenever a macroblock of matching type has been encoded (skipped macroblocks are excluded). x is recalculated before starting a new picture. $\alpha_x$ determines the amount of low-pass filtering. It is preferably set to $10^{-3}$. $s_0$ and $p_0$ are constants that stabilize x in case of low bitrate/low energy macroblocks. For $x_{intra}$, $s_0$ is preferably set to 75, and $p_0$ is preferably set to 50, otherwise $s_0$ is preferably set to 50, and $p_0$ is preferably set to 25. This results in asymptotic values of 1.5 for $x_{intra}$, and of 2.0 for $x_{nonintra,p}$ and $x_{nonintra,b}$. These constants have been determined by experiment. Thus, other values may be substituted, if desired, to obtain other results.

It should be understood that the implementation of other variations and modifications of the invention in its various aspects will be apparent to those of ordinary skill in the art, and that the invention is not limited by the specific embodiments described. For example, the specific type of stream being encoded may be varied. As another example, various aspects of the invention may be implemented without implementing other aspects. It is therefore contemplated to cover by the present invention, any and all modifications, variations, or equivalents that fall within the spirit and scope of the basic underlying principles disclosed and claimed herein.

What is claimed is:

1. A method for rate control for a constant-bit-rate finite-buffer-size video encoder comprising:

obtaining, by the video encoder, a scene change indication from a prediction error image;

using, by the video encoder, the scene change indication from the prediction error image to reset a global complexity history associated with frames of video;

using the global complexity history to provide the rate control for the video encoder encoding the video frames;

wherein the obtaining the scene changes indication from the prediction error image further comprises:

counting a first number of intra-code pixel blocks in the prediction error image;

counting a second number of non-intra code pixel blocks in the prediction error image;

calculating a ratio of the first number and the second number;

comparing the ratio to a threshold to determine a result; and using the result as the scene change indication.

2. The method of claim 1 comprising producing global complexity values for the global complexity history using a scene change adaptive low-pass filter.

* * * * *